US012729839B1

(12) United States Patent
Del Valle, Sr.

(10) Patent No.: US 12,729,839 B1
(45) **Date of Patent: *Sep. 8, 2026**

(54) SHADOW-FREE ILLUMINATION LAMP

(71) Applicant: Prospection Solutions, LLC, Kearney, MO (US)

(72) Inventor: Boris Del Valle, Sr., Kearney, MO (US)

(73) Assignee: PROSPECTION SOLUTIONS, LLC, Kearney, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/340,046

(22) Filed: Sep. 25, 2025

Related U.S. Application Data

(63) Continuation of application No. 19/074,810, filed on Mar. 10, 2025, now Pat. No. 12,449,112.

(51) Int. Cl.

| | |
|---|---|
| ***F21V 19/00*** | (2006.01) |
| ***F21S 4/28*** | (2016.01) |
| ***F21V 3/04*** | (2018.01) |
| *F21Y 115/10* | (2016.01) |

(52) U.S. Cl.
CPC ............ *F21V 19/0045* (2013.01); *F21S 4/28* (2016.01); *F21V 3/049* (2013.01); *F21Y 2115/10* (2016.08)

(58) Field of Classification Search
CPC ........ F21V 19/0045; F21V 3/049; F21S 4/28; F21Y 2115/10
See application file for complete search history.

(56) References Cited

U.S. PATENT DOCUMENTS

| | | | | |
|---|---|---|---|---|
| 6,214,427 | B1 * | 4/2001 | Levinson | C30B 1/02 257/E21.119 |
| 10,012,375 | B1 * | 7/2018 | Salessi | F21V 29/503 |
| 11,567,243 | B2 | 1/2023 | Yu et al. | |
| 11,606,867 | B2 * | 3/2023 | Yu | H05K 5/30 |
| 2012/0048701 | A1 | 3/2012 | Liu | |
| 2018/0313527 | A1 * | 11/2018 | Engelmann | F21V 23/06 |
| 2022/0252226 | A1 | 8/2022 | Gielen et al. | |
| 2024/0210022 | A1 | 6/2024 | Ernst | |
| 2025/0003578 | A1 * | 1/2025 | Huang | F21V 23/02 |

FOREIGN PATENT DOCUMENTS

| | | | | |
|---|---|---|---|---|
| CN | 203979978 U | * | 12/2014 | |
| KR | 20230069358 A | * | 5/2023 | F21V 15/01 |

OTHER PUBLICATIONS

English translation of Gu CN-203979978-U (Year: 2014).*
English translation of Cho KR-20230069358-A (Year: 2023).*

* cited by examiner

*Primary Examiner* — Evan P Dzierzynski
(74) *Attorney, Agent, or Firm* — SHUTTLEWORTH & INGERSOLL, PLC; Jason R. Sytsma

(57) ABSTRACT

A modular base supporting a mounting surface arranged in an undulating pattern with convex and concave deviations from a reference axis. Light sources secured on the mounting surface emit light, scattered by the undulating pattern to reduce shadows and enhance uniformity.

20 Claims, 7 Drawing Sheets

SHADOW-FREE ILLUMINATION LAMP

CROSS-REFERENCE TO RELATED APPLICATIONS

This present application is a continuation of U.S. patent application Ser. No. 19/074,810 filed Mar. 10, 2025 the contents of which are hereby incorporated by reference herein.

TECHNICAL FIELD

This disclosure relates to illumination systems, and more specifically, to an arrangement of light sources positioned in a periodic, undulating pattern to enhance illumination uniformity and reduce shadow artifacts in various applications, including machine vision inspection lighting, task lighting, medical lighting, and display illumination.

BACKGROUND INFORMATION

Effective illumination is crucial in a wide range of applications, from workspaces and surgical environments to food inspection. Traditional lighting designs typically employ either a continuous light source or an array of discrete light sources arranged in linear or circular patterns. However, these configurations often result in pronounced shadows and uneven illumination due to the directional nature of light emission.

One known approach to improving shadow reduction involves the use of light shades or diffusers with a periodic or wavy edge to scatter light and reduce harsh shadow formation. A wavy edge design, wherein the shade features an undulating contour, disrupts the uniform shadow boundary and introduces a gradual transition between illuminated and shadowed regions. This effect is achieved by modifying the occlusion geometry of the shade, allowing more light to be scattered into previously shadowed areas. As a result, this technique has been employed to mitigate the formation of sharp shadows.

While light-shade-based solutions offer some advantages in shadow diffusion, they also introduce several drawbacks.

Loss of Light Intensity: The use of an obstructing shade inherently blocks a portion of emitted light, leading to reduced overall illumination efficiency.

Glare and Light Spill Issues: Depending on the shape of the wavy edge, undesired refractions and reflections may cause glare or non-uniform light dispersion in unintended areas.

Limited Flexibility: Fixed light-shade geometries provide only a static modification of light distribution, making them less adaptable to varying illumination requirements.

Complex Manufacturing and Aesthetic Considerations: Incorporating periodic or sinusoidal patterns into rigid light shades can complicate manufacturing and design processes, particularly when integrating them into consumer lighting fixtures.

Given these limitations, an improved lighting system is needed that achieves the benefits of a undulating light-distribution effect without relying on external occluding elements such as shades. Instead of employing a passive diffuser, the present invention provides an active, structural modification to the light source arrangement itself. By positioning individual light sources along a periodic, undulating path, the lighting system naturally softens shadows, enhances uniformity, and increases efficiency without the inherent drawbacks of external shading components.

SUMMARY

The present invention provides a lighting apparatus and method for illuminating a workspace with enhanced uniformity and reduced shadow formation, addressing limitations of traditional lighting systems that rely on external occluding elements like shades or diffusers. The apparatus comprises a base configured as a modular structure, a mounting surface supported by the base and arranged in an undulating pattern defined by alternating convex and concave deviations from a reference axis, and a plurality of light sources secured on the mounting surface. The undulating pattern scatters light emitted from the light sources, creating a gradual transition between illuminated and shadowed regions to mitigate harsh shadows and improve visibility without the need for external diffusers, thereby preserving light intensity and simplifying design. The undulating pattern may follow a non-periodic or periodic contour, such as sinusoidal, triangular, sawtooth, parabolic, or elliptical shapes, optimizing light dispersion for various applications.

The modular base can include interlocking features, such as male and female connectors at longitudinal or lateral ends, enabling tool-free assembly of multiple bases into linear, curved, or laterally expanded arrangements. This scalability allows customization of the lighting footprint, with options for end-to-end extension or side-to-side expansion. In a laterally expanded configuration, adjacent bases can support distinct light sources—for example, one emitting visible light and another emitting non-visible light (e.g., ultraviolet or infrared)—to provide mixed-wavelength illumination tailored to specific tasks, such as inspection or sterilization. The interlocking features may include snap-fit tabs, dovetail joints, magnetic couplings, or fasteners, facilitating rapid assembly and reconfiguration. Thus, interlocking features can allow for tool-free expansion. Light sources may be adhered with adhesive or secured to the mounting surface via inwardly oriented dovetails, allowing slidable insertion and replacement for ease of maintenance.

In certain embodiments, the apparatus further includes a housing assembly encasing the base and light sources, featuring a substantially transparent shield to transmit light while protecting against environmental contaminants like water or dust, and ventilation air channels with fans to dissipate heat from the light sources. A power distribution and control system electrically coupled to the light sources enables selective activation and intensity adjustment, with the light sources optionally comprising LED strips for efficient, uniform illumination.

The corresponding method involves may include providing the modular base, arranging the undulating mounting surface, securing the light sources, and emitting light to achieve the desired shadow-reduction effect, with additional steps for assembling multiple bases and configuring mixed-wavelength outputs.

The apparatus and method disclosed herein offers a versatile, efficient lighting solution adaptable to diverse workspaces, from general task areas to specialized environments requiring precise or multi-spectral illumination.

BRIEF DESCRIPTION OF THE DRAWINGS

These and other features and advantages of the present invention will be better understood by reading the following detailed description, taken together with the drawings wherein:

FIG. 7-1 is a continuation of the circuit diagram of FIG. 7.

DETAILED DESCRIPTION OF THE PREFERRED EMBODIMENTS

Figure 1:
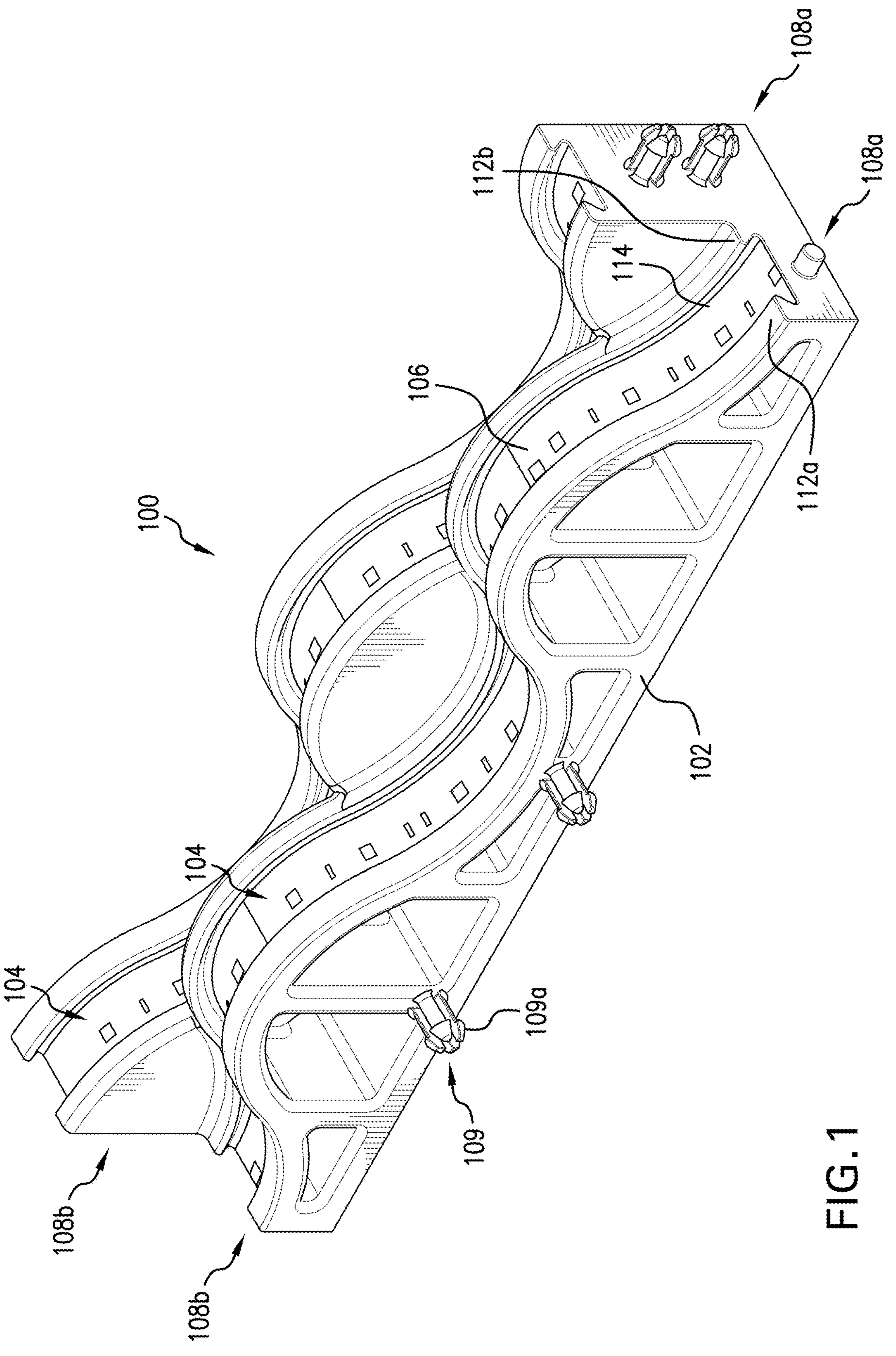
FIG. 1 is a perspective view of a lighting array on an undulating surface according to this disclosure.
Figure 3:
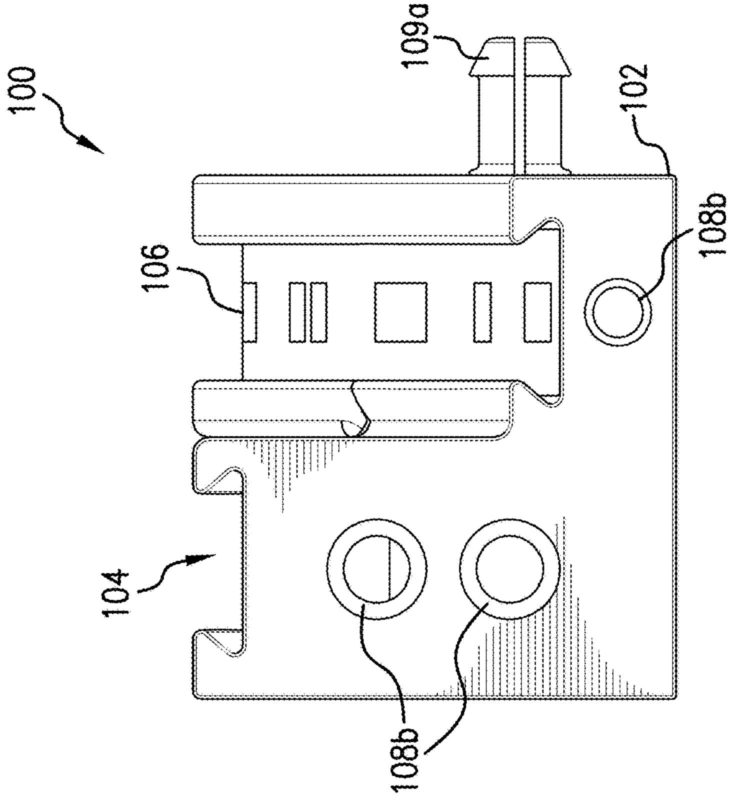
Figure 2:
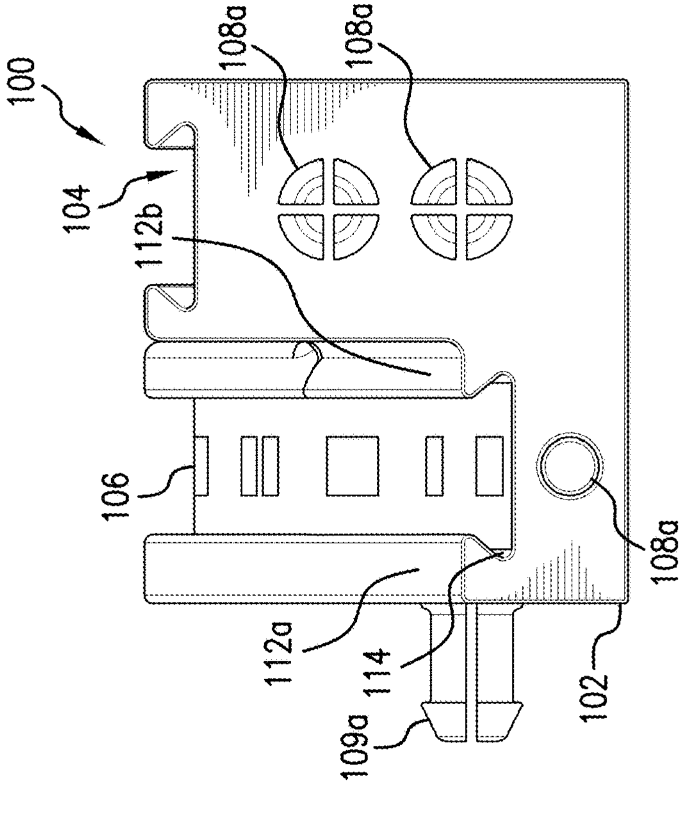
FIG. 2 is a front facing view of the FIG. 3 is a rear-facing view

In accordance with one aspect of the present invention, a lamp 100 comprising of a base 102 supporting a mounting channel 104 configured to receive a light sources 106 is disclosed. Base 102 supports mounting channel 104 that is arranged in a periodic, undulating pattern to scatter light and reduce harsh shadow formation. The undulating pattern disrupts a uniform shadow boundary and introduces a gradual transition between illuminated and shadowed regions. This effect is achieved by modifying the geometry of the light dispersal, allowing more light to be scattered into more areas and to mitigate the formation of sharp shadows.

For the purposes of this disclosure, an undulating pattern refers to a non-periodic, periodic, or quasi-periodic spatial arrangement in which mounting channel 104 or elements, such as light sources 106, follow a path characterized by alternating convex and concave deviations from a reference axis. The reference axis can be any line on a surface of base 102, for example, the bottom surface of base 102 from which the structure extends. The pattern may be defined mathematically as non-periodic or periodic by sinusoidal functions, piecewise polynomial curves, spline-based paths, or other continuous or segmented waveforms. The undulations may exhibit uniform or non-uniform amplitude and wavelength, and may vary in shape, including but not limited to sinusoidal, triangular, sawtooth, parabolic, elliptical, or irregularly modulated contours. The undulating pattern may be defined in one-dimensional, two-dimensional, or three-dimensional spatial arrangements and may be dynamically adjustable.

Base 102 with mounting channel 104 are formed to support the undulating pattern. Base 102 serves as a support and mounting structure for lamp 100. Base 102, is configured to incorporate mounting channel 104 that follows the predefined undulating path, enabling precise placement of light sources 106 along a curved trajectory that enhances illumination uniformity and shadow reduction. The undulating pattern scatters light from the light sources 106 to reduce shadow formation and enhance illumination uniformity without external occluding elements, such as separate, passive components or structures positioned outside the primary light-emitting source or its immediate mounting arrangement, which are designed to block, redirect, or diffuse light to modify its distribution or reduce undesirable effects like shadows or glare (e.g., light shades, diffusers, reflectors, louvers or grilles, or baffles). Illumination uniformity refers to as a consistent distribution of light intensity across a target area where variations in brightness are minimized to ensure even lighting without significant gradients, hotspots, or dark patches.

Base 102 can be made as a solid structure or as a truss to reduce the amount of material and weight. Base 102 can fabricated using various materials and manufacturing techniques, including but not limited to:

- 3D Printing: Base 102 may be additively manufactured from thermoplastics such as polylactic acid (PLA), acrylonitrile butadiene styrene (ABS), polyethylene terephthalate glycol (PETG), polycarbonate (PC), or nylon, providing design flexibility and rapid prototyping capabilities.
- Extrusion: For mass production, base 102 may be extruded from aluminum, stainless steel, or high-performance plastics, ensuring durability, heat dissipation, and structural stability.
- Injection Molding: Base 102 may be formed from injection-molded polymers, such as polypropylene (PP), polyetherimide (PEI), or fiberglass-reinforced composites, for applications requiring high strength-to-weight ratios.
- Machining: Base 102 can be CNC-machined from solid metal blocks or polymer sheets, providing precise geometric tolerances suitable for industrial and medical applications.

Base 102 is constructed as a modular, sectioned structure, enabling seamless extension to any desired length through snap-together connections. Each section of base 102 is designed with integrated interlocking features 108, such as male-female connectors 108*a*, 108*b*, dovetail joints, or snap-fit tabs, allowing multiple sections to be securely joined without the need for additional fasteners or adhesives. This modular configuration provides scalability and customization, making it adaptable for a wide range of lighting applications.

Each section of base 102, for example, can be fabricated with standardized interlocking features 108 at both ends, allowing multiple units to be linked in series to achieve a continuous lighting array. The snap-fit mechanism ensures: (i) Tool-free assembly and disassembly, facilitating quick installation and reconfiguration; (ii) Electrical continuity (if conductive pathways are included) for powering multiple interconnected light modules without requiring separate wiring; and (iii) Structural integrity, preventing misalignment or separation under operational conditions. This extendable design is particularly beneficial for applications where adjustable illumination coverage is required, such as machine vision systems or conveyor belt lighting.

Figure 4:
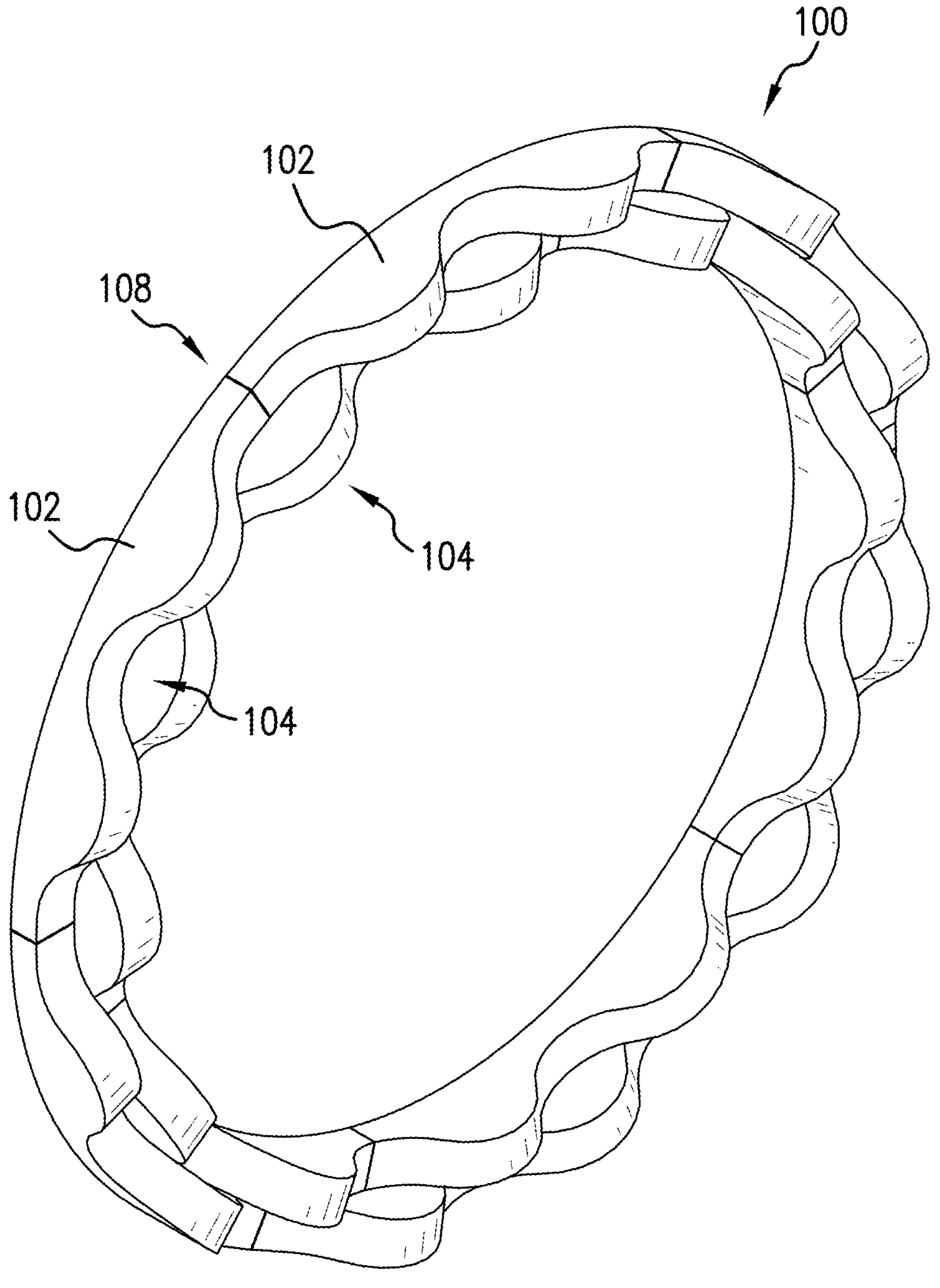
FIG. 4 is perspective view of a lighting array on an undulating surface that is formed in a circle.

In addition to linear extensions, base 102 may be manufactured in pre-curved sections or flexible modular segments, enabling the formation of: (i) Circular lamps or ring lights, as shown in FIG. 4, ideal for 360-degree illumination in microscopy, surgical lighting, or machine vision inspection where uniform light distribution is essential; (ii) Custom-curved lighting shapes, allowing integration into non-linear architectural designs, automotive lighting, or ergonomic workstation lamps; and (iii) Elliptical, parabolic, or helical configurations, tailored for specific optical applications requiring directional light control. Each curved section of base 102 is designed with precisely engineered connection points, ensuring smooth transitions between segments without creating visible gaps or inconsistencies in light distribution.

Figure 5:
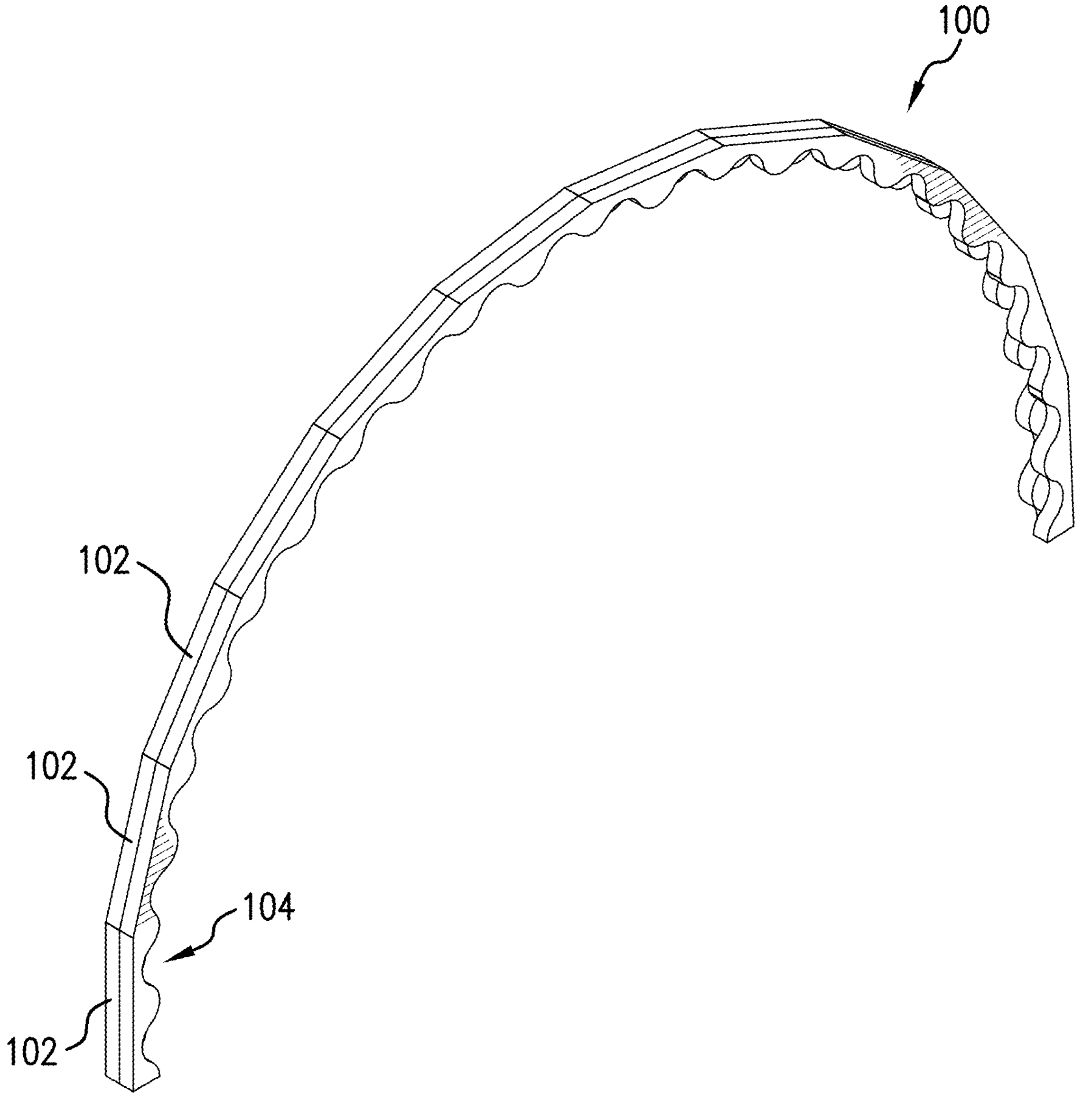
FIG. 5 is a perspective view of a lighting array on an undulating surface that is formed in a semi-circle.

To accommodate complex lighting geometries, base 102 may include mix-and-match straight and curved sections, allowing users to: (i) Create semi-circular or arched lighting fixtures, as shown in FIG. 5, for wall-mounted or overhead installations; (ii) Combine convex and concave sections to direct light in a targeted, controlled manner; and (iii) Integrate adjustable hinge or pivot joints between segments for dynamically reconfigurable lighting arrays.

Base 102 may be manufactured from rigid materials (e.g., aluminum, steel, or reinforced thermoplastics) for fixed curved configurations. Base 102 can also be made from semi-flexible polymers (e.g., silicone-infused plastics or elastomer composites) to allow bendable or adaptive positioning without compromising durability. The scalability of base 102 enables customization of light coverage for different applications, ease of transport and storage, since modular sections can be disassembled for compact storage and transported efficiently. Base 102 can also be manufactured cost effectively, because curved and straight sections can be mass-produced separately and combined as needed for different lighting system configurations.

Base 102 can also be expanded laterally, side-to-side, to increase the width of the illumination field. Lateral expansion is facilitated by secondary interlocking features 109, such as male-female connectors 109*a*, dovetail joints, or snap-fit tabs integrated along the sides of each base 102. These features allow multiple units of base 102 to be connected in parallel, forming a wider lighting array. For example, two or more linear or curved sections of base 102 can be joined laterally to illuminate a broader workspace, such as a large inspection table or surgical field. The lateral interlocking features 109 can maintain alignment of the undulating mounting channels across sections or be offset from each other, as shown, ensuring consistent light distribution without gaps or overlaps. Base 102 can also be pre-formed with multiple laterally adjacent bases 102, as shown. Optionally, lateral expansion may include flexible bridge connectors to accommodate spaces between adjacent units. This could allow for the placement of a camera of a machine vision system to view through the space.

Mounting channel 104 is integrated on top of base 102 and follows a continuous, undulating path. In the illustrated embodiment, mounting channel 104 is opened at each end with inwardly oriented dovetails 112*a*, 112*b* on opposite sides of mounting surface 114 allowing for the insertion of light sources 106. Each base 102 with mounting channel 104 can serve as a connection point or splice bite for adjoining sections of light sources 106, which improved modularity and ease of replacement of damaged sections.

Mounting channel 104, however, can be open ended or closed ended with for insertion and securement of light sources. Mounting channel 104 dimensioned to accommodate different light modules, such as LED strips, fiber optic bundles, or laser diode arrays. Mounting channel 104 can also be equipped with fasteners or clips to facilitate easy installation, removal, and repositioning of light sources along the undulating path. Light sources 106 could also be secured to mounting surface 114 by glue or other form of adhesive.

Mounting channel 104 can be constructed from aluminum or thermally conductive plastics with base 102 functioning as a heat sink. Mounting channel 104 can be manufactured with ventilation channels to manage thermal output from high-intensity light sources.

Light sources 106 are configured to be inserted into mounting channel 104 and may include a broad array of illumination technologies, such as, but not limited to, light-emitting diodes (LEDs), organic LEDs (OLEDs), fiber optic strands, laser diode arrays, incandescent bulbs, fluorescent tubes, compact fluorescent lamps (CFLs), halogen lamps, high-intensity discharge (HID) lamps (e.g., metal halide, sodium vapor), electroluminescent (EL) panels or wires, plasma lamps, and quantum dot LEDs (QLEDs). In one embodiment, LEDs are arranged in a strip format, with dimensions such as ⅜" wide, ⅛" thick, and available in 16.4' sections, featuring a 1⅛" spacing between each LED and a beam angle of 120 degrees, optimizing light overlap along the undulating path to minimize shadow formation. Other light sources, such as incandescent or halogen bulbs, may be mounted individually or in linear arrays with socketed bases compatible with mounting channel 104, providing high-lumen output for general illumination. Fluorescent tubes or CFLs, available in modular lengths (e.g., 2' or 4' sections), can be secured within the channel using clips or end-caps, offering energy-efficient, diffuse light suitable for large workspaces. Fiber optic strands may be bundled and routed through the channel, terminating in adjustable lenses or diffusers to direct light precisely, while laser diode arrays can emit collimated beams for high-precision tasks, such as machine vision or surgical applications. Light sources 106 may emit white light with adjustable color temperatures (e.g., 2700 K to 6500 K) for task adaptability, monochromatic light (e.g., red, green, blue) for aesthetic or functional purposes, or non-visible wavelengths, such as ultraviolet (UV) for sterilization, fluorescence excitation, or curing processes, and infrared (IR) for thermal imaging or night vision support. With a laterally expanded base 102, as described above, each adjacent mounting channel 104 could be configured with light sources of differing wavelengths—for instance, a UV-emitting source alongside a visible-light source to delineate a boundary for non-visible illumination, enhancing safety or operational clarity in mixed-use environments. Electroluminescent panels or wires, being thin and flexible, can conform to the undulating path for uniform, low-profile lighting, while HID lamps or plasma sources, with their intense output, may suit industrial settings requiring broad-area illumination. The benefit of using strip lighting (e.g., LED or fluorescent strips) or other modular formats for light source 106 lies in their scalability, ease of replacement, and compatibility with commercial off-the-shelf (COTS) components, enabling cost-effective customization to fit any configuration of base 102 and mounting channel 104. Additionally, hybrid configurations—such as combining OLEDs for soft, diffuse light with laser diodes for focused beams—can be implemented within a single channel or across adjacent channels, leveraging the modular design to meet diverse illumination needs.

Figure 6:
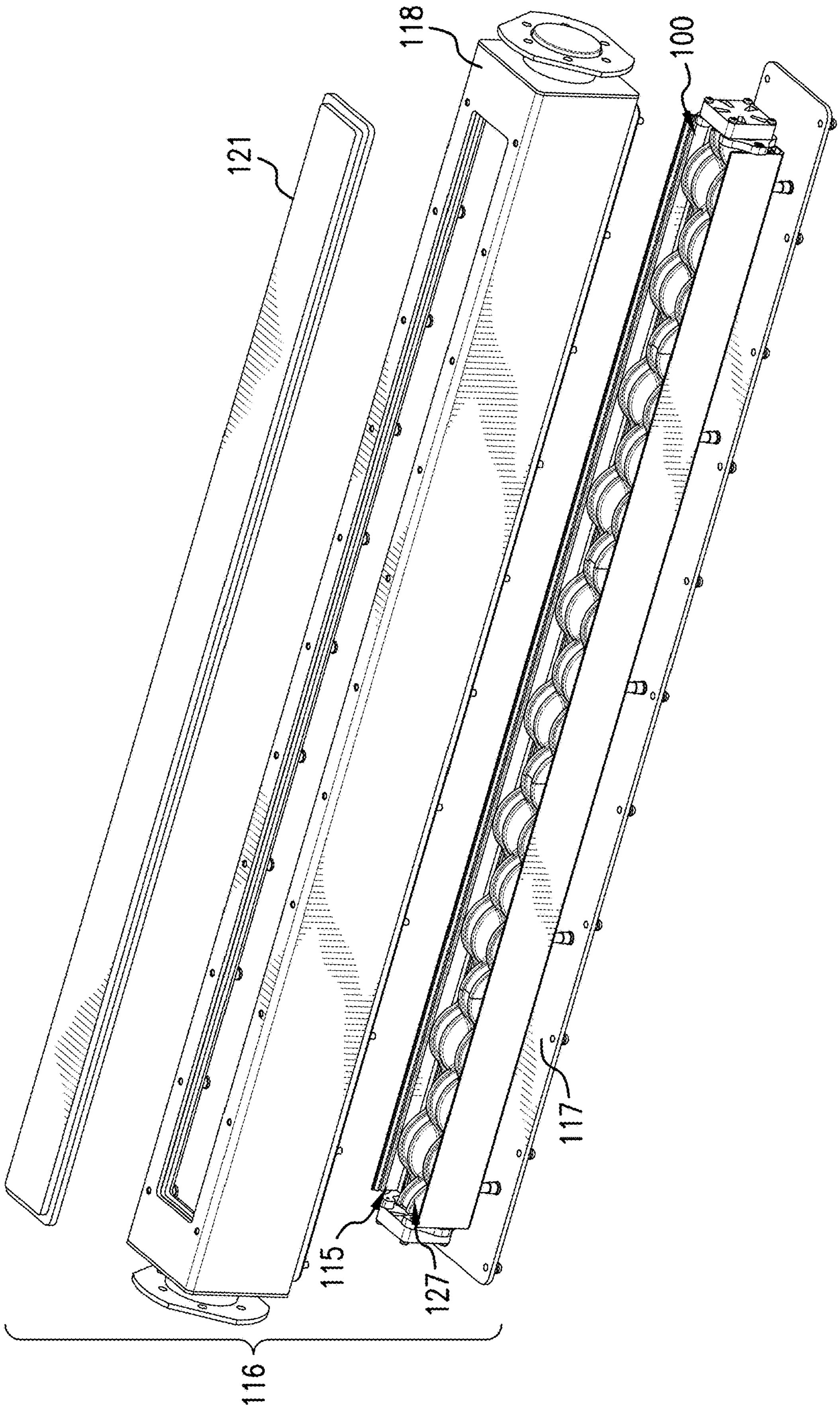
FIG. 6 is an exploded view of a housing for the lighting array of FIG. 1.

FIG. 6 illustrates an exploded view of housing assembly 116 for lamp 100, which integrates base 102 and an array of light sources 106. Housing assembly 116 comprises housing 118, a receptacle 115 configured to securely receive base 102 via a snap-fit or alternative attachment mechanism (e.g., threaded fasteners, magnetic couplings, or slide-and-lock rails), and a top cover 117 that conceals and protects wiring and control circuitry for light sources 106 while remaining accessible for maintenance. Housing 118, serving as a robust outer shell, may be constructed from durable, corrosion-resistant materials such as stainless steel, aluminum, high-strength polymers (e.g., polycarbonate, ABS), or reinforced composites, tailored to withstand environmental stresses like chemical exposure, temperature extremes, or mechanical impact. A transparent or translucent shield 121—made from materials such as plexiglass, tempered glass, acrylic, or optical—grade polycarbonate-covers the bottom of housing 118, permitting light transmission while preventing ingress of water, dust, debris, or other contaminants, with sealing options (e.g., gaskets, O-rings, or silicone) to achieve ingress protection ratings (e.g., IP65, IP67) suitable for wet or dusty conditions. To manage thermal output from light sources 106 and associated electronics, housing 118 incorporates ventilation features such as air channels 127, louvers, or perforations for passive heat exchange, with optional active cooling provided by fans 129 (see FIG. 7-1), blowers, or liquid cooling conduits mounted within or atop the assembly. Designed for versatility, housing assembly 116 is fully sealable with smooth, non-porous surfaces and optional antimicrobial coatings, meeting stringent hygiene and safety standards (e.g., NSF, FDA, USDA) for sensitive environments like food processing, meat packing, pharmaceutical production, or cleanrooms, as well as hazardous settings (e.g., explosive atmospheres or chemical plants) with flame-retardant reinforcements. Optional mounting accessories, such as brackets, pole adapters, or suspension hooks, enable installation on walls, ceilings, floors, or portable stands, ensuring adaptability across residential, commercial, industrial, or field applications. This comprehensive design ensures housing assembly 116 protects lamp 100 while optimizing functionality, durability, and compliance in diverse operating conditions, from sterile laboratories to rugged outdoor worksites.

Figure 7:
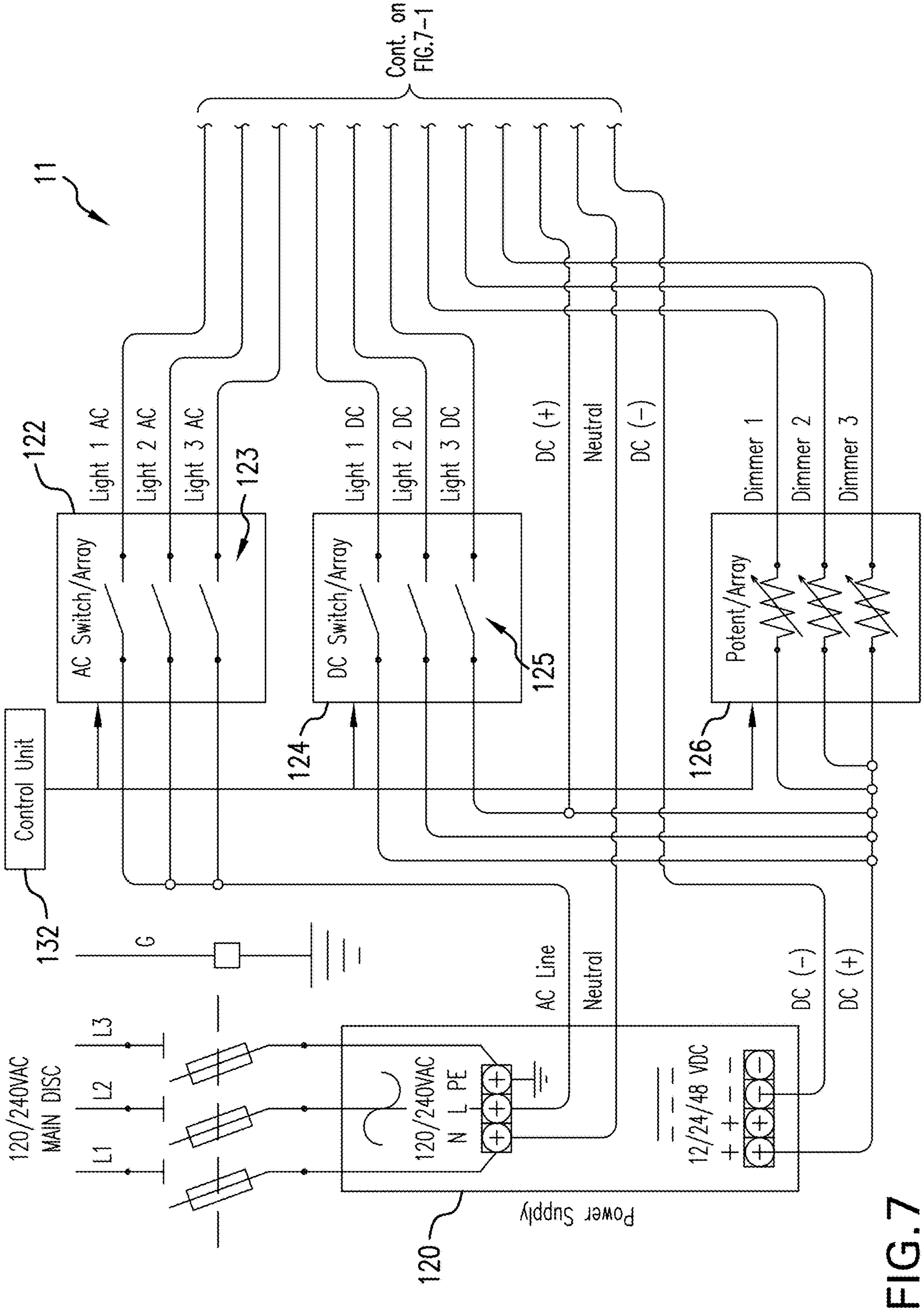
FIG. 7 is a circuit diagram for operating the lighting array of FIG. 6.
Figures 1, 7:
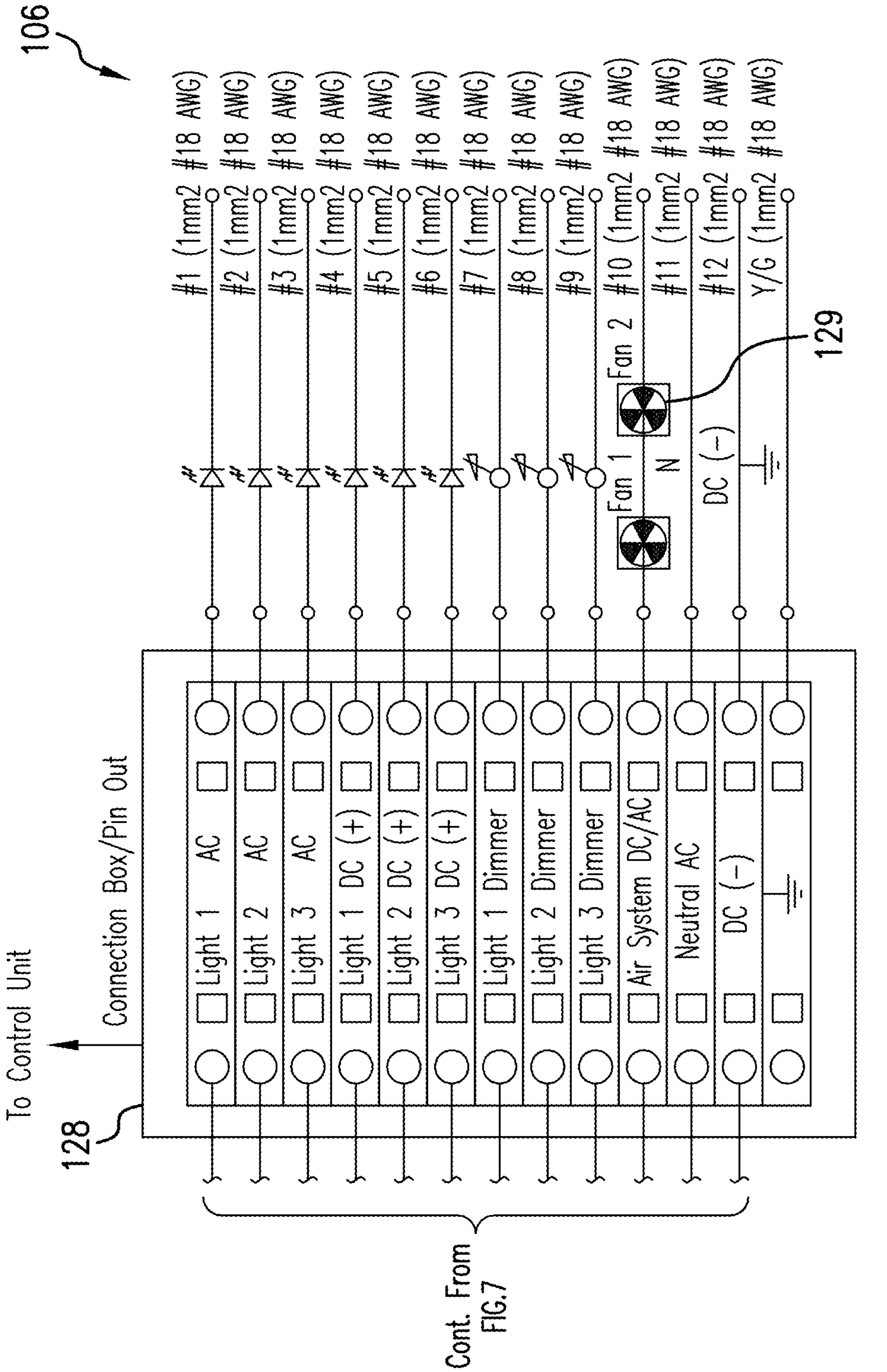

FIG. 7 shows the electrical schematic for controlling light sources 106. In an embodiment, a power distribution and control system 119 for LED lighting and fans is provided. A universal power supply 120 receives three-phase AC input (e.g., 122V/240V) and generates separate AC and DC outputs. Universal power supply 120 can an AC switch array 122, a DC switch array 124, and a potentiometer array 126 for dimming, all of which connect to a distribution box that supplies power to array of light sources 106 and ventilation fans 129. More specifically, universal power supply 120 can receive a single or three-phase 120V/240V AC input and converts it into two distinct outputs: a two-line AC output and a regulated DC voltage output. The AC output is directed to AC switch array 122 comprising multiple switches 123, each corresponding to an individual AC-powered light sources 106. This configuration allows independent ON/OFF control of each AC powered light source 106. The DC output is split into two branches: a DC switch array 124 and a potentiometer array 126. DC switch array 124 comprises of multiple switches 125 corresponding to individual DC-powered light sources 106, enabling selective activation. Potentiometer array 126 is wired in parallel with DC switch array 124, allowing for adjustable voltage or current control, thereby enabling dimming functionality for the DC-powered light sources 106. All or any combination of AC switch array 122, a DC switch array 124, and a potentiometer array 126 can be used. A connection box 128 serves as the final distribution hub, receiving one or both AC and DC power lines from their respective switch AC switch array 122, DC switch array 124, and potentiometer array 126, and routing them to the appropriate fixtures for light sources 106. AC-powered LEDs, for example, operate in a straightforward ON/OFF manner, while DC-powered LEDs, for example, benefit from dimming control via potentiometer array 126. System 119 also includes fans 129 directly connected to the DC output to maintain continuous airflow and cooling.

Optional features include surge protection, power factor correction, and emergency battery backup within universal power supply 120, ensuring reliability in unstable or critical environments (e.g., outdoor worksites, medical facilities). All components of system 119 can be selectively combined-using AC switch array 122 alone for simple setups, or integrating DC switch array 124 and potentiometer array 126 for advanced control-offering scalability and adaptability to the invention's modular design.

A control unit 132 may be integrated into system 119 to provide dynamic, programmable management of light sources 106 and auxiliary components, enhancing the functionality of system 119 across diverse applications such as workspaces, food inspection, surgical lighting, or machine vision systems. Control unit 132 interfaces with AC switch array 122, DC switch array 124, and potentiometer array 126 via a microcontroller or programmable logic controller (PLC), enabling real-time adjustments to light intensity, color temperature, wavelength selection (e.g., toggling between UV and visible light), or activation patterns (e.g., pulsing for stroboscopic effects, sequential activation for conveyor tracking). Communication with control unit 132 can occur through wired protocols (e.g., DMX512, Modbus, Ethernet) or wireless protocols (e.g., Bluetooth, Zigbee, Wi-Fi, LoRa), allowing remote operation or integration with smart building systems. For example, in a laterally expanded base 102 with multiple mounting channels 104, control unit 132 can independently adjust adjacent sections—dimming visible LEDs in one channel while pulsing IR LEDs in another—to create boundary zones or task-specific illumination profiles. Advanced features may include sensors (e.g., ambient light sensors, temperature sensors, occupancy detectors) mounted within housing assembly 116, feeding data to control unit 132 for automated responses, such as increasing fan speed under high thermal loads or reducing brightness in low-traffic areas. Control unit 132 may also support pre-programmed modes tailored to the undulating pattern's shadow-reduction capabilities—e.g., a 'soft glow' mode with uniform dimming across all sources, or a 'high-contrast' mode emphasizing alternating source activation. In sensitive environments (e.g., food processing, cleanrooms), control unit 132 can incorporate diagnostic capabilities, monitoring power draw or component health to ensure compliance with safety standards (e.g., NSF, FDA). For rugged or portable applications, control unit 132 may be housed in a sealed, shock-resistant module within housing 118, with an optional touchscreen or button interface for manual overrides. This enhanced control system complements the invention's modularity and environmental adaptability, enabling precise customization of light output to optimize uniformity, reduce shadows, and meet the demands of any operational context.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A lighting apparatus for illuminating a workspace, comprising:

a base configured as a modular structure;

a mounting surface supported by the base and arranged in an undulating pattern defined by alternating convex and concave deviations from a reference axis; and a plurality of light sources secured on the mounting surface, wherein the undulating pattern of the mounting surface scatters light from the light sources to reduce shadow formation and enhance illumination uniformity without external occluding elements.

2. The lighting apparatus of claim 1, wherein the alternating convex and concave deviations of the undulating pattern position adjacent ones of the plurality of light sources at differing angular orientations relative to the reference axis.

3. The lighting apparatus of claim 1, wherein the undulating pattern follows a periodic pattern.

4. The lighting apparatus of claim 3, wherein the undulating pattern is one chosen from a sinusoidal, triangular, sawtooth, parabolic, or elliptical contour.

5. The lighting apparatus of claim 1, wherein the base comprises interlocking features configured for assembly of multiple bases into a linear, curved, or laterally expanded arrangement.

6. The lighting apparatus of claim 5, wherein the interlocking features comprises at opposite longitudinal ends, one of a male and a female connector for tool-free assembly of multiple base, end-to-end.

7. The lighting apparatus of claim 5, wherein the interlocking features comprises on opposite lateral ends, one of a male and a female connector for tool-free assembly of multiple base, side-to-side for lateral expansion.

8. The lighting apparatus of claim 5, and further comprising a first base and a second base connected adjacent to each other in the laterally expanded arrangement; wherein the plurality of light sources combined to the mounting surface of the first base emit visible light; and wherein the plurality of light sources combined to the mounting surface of the second base emit light outside the visible range.

9. The lighting apparatus of claim 5, wherein the interlocking features comprises one chosen from snap-fit tabs, dovetail joints, magnetic couplings, and fasteners.

10. The lighting apparatus of claim 1, and further comprising inwardly oriented dovetails projecting over the mounting surface configured to slidably receive and secure the plurality of light sources.

11. The lighting apparatus of claim 1, and further comprising:

a housing assembly encasing the base and the plurality of light sources, the housing assembly comprises of a substantially transparent shield configured to transmit light while protecting the light sources from environmental contaminants, and ventilation air channels and a fans configured to dissipate heat from the plurality of light sources;

a power distribution and control system electrically coupled to the plurality of light sources, configured to provide selective activation and intensity adjustment of the light sources; and wherein the plurality of light sources comprises of LED strips.

12. The lighting apparatus of claim 1, wherein the mounting surface is arranged in a fixed undulating pattern.

13. The lighting apparatus of claim 1, wherein the alternating convex and concave deviations of the undulating pattern extend in a direction having a non-zero component parallel to a primary emission direction of the plurality of light sources.

14. A method of illuminating a workspace, comprising:

providing a base configured as a modular structure;

arranging a mounting surface supported by the base in an undulating pattern defined by alternating convex and concave deviations from a reference axis;

securing a plurality of light sources on the mounting surface; and emitting light from the plurality of light sources, wherein the undulating pattern of the mounting surface scatters the emitted light to reduce shadow formation and enhance illumination uniformity without external occluding elements.

15. The method of claim 14, wherein arranging the mounting surface includes forming the undulating pattern as a periodic pattern selected from one chosen from a sinusoidal, triangular, sawtooth, parabolic, or elliptical contour.

16. The method of claim 14, further comprising assembling multiple bases into a linear, curved, or laterally expanded arrangement using interlocking features on the base.

17. The method of claim 16, wherein assembling multiple bases includes connecting a first base to a second base end-to-end using interlocking features comprising a male connector on one longitudinal end of the first base and a female connector on an opposite longitudinal end of the second base, enabling tool-free assembly.

18. The method of claim 16, wherein assembling multiple bases includes connecting a first base to a second base side-to-side using interlocking features comprising a male connector on one lateral end of the first base and a female connector on an opposite lateral end of the second base, enabling tool-free lateral expansion.

19. The method of claim 16, further comprising:

securing a first plurality of light sources to the mounting surface of the first base, the first plurality of light sources configured to emit visible light;

securing a second plurality of light sources to the mounting surface of the second base, the second plurality of light sources configured to emit light outside the visible range; and emitting visible light from the first plurality of light sources and non-visible light from the second plurality of light sources to provide mixed-wavelength illumination.

20. The method of claim 14, wherein securing the plurality of light sources includes slidably inserting the plurality of light sources beneath inwardly oriented dovetails projecting over the mounting surface.

* * * * *